United States Patent [19]

Rice

[11] 4,428,226
[45] Jan. 31, 1984

[54] REAL TIME PRESSURE SIGNAL SYSTEM FOR A ROTARY ENGINE

[75] Inventor: William J. Rice, Elyria, Ohio

[73] Assignee: The United States of America as represented by the Administrator of the National Aeronautics and Space Administration, Washington, D.C.

[21] Appl. No.: 350,473

[22] Filed: Feb. 19, 1982

[51] Int. Cl.³ ............................................. G01M 15/00
[52] U.S. Cl. ........................................ 73/115; 364/558
[58] Field of Search ........................... 73/115; 364/558

[56] References Cited

U.S. PATENT DOCUMENTS 4,094,190 6/1978 Jindrick ................................. 73/115
4,111,041 9/1978 Rice ..................................... 73/115

Primary Examiner—Gerald Goldberg
Assistant Examiner—John E. Chapman, Jr.
Attorney, Agent, or Firm—Norman T. Musial; John R. Manning; James A. Mackin

[57] ABSTRACT

A real-time IMEP signal which is a composite of those produced in any one chamber of a three-lobed rotary engine is developed by processing the signals of four transducers positioned in a Wankel engine housing such that the rotor overlaps two of the transducers for a brief period during each cycle. During the overlap period of any two transducers, their output is compared and sampled for $10\mu$ seconds per 0.18° of rotation by a sampling switch and capacitive circuit. When the switch is closed, the instantaneous difference between the value of the transducer signals is provided while with the switch open the average difference is produced. This combined signal, along with the original signal of the second transducer, is fed through a multiplexer to a pressure output terminal. Timing circuits, controlled by a crank angle encoder on the engine, determine which compared transducer signals are applied to the output terminal and when, as well as the open and closed periods of the switches.

11 Claims, 8 Drawing Figures

REAL TIME PRESSURE SIGNAL SYSTEM FOR A ROTARY ENGINE

DESCRIPTION

Origin of the Invention

This invention was made by an employee of the U.S. Government and may be manufactured or used by or for the Government without the payment of any royalties thereon or therefor.

Technical Field

This invention relates to equipment for measuring the indicated mean effective pressure (IMEP) of internal combustion engines. It is directed more particularly to a system for measuring in real time the IMEP of a rotary engine such as a Wankel engine.

Although present rotary engines have much higher specific fuel consumption than comparable reciprocating engines, they have a number of advantages such as simplicity, compactness, high specific power, stratified charge adaptability and low noise levels. These, together with high specific power and multifuel tolerance, warrant study of the rotary type engine for use in general aviation aircraft.

In order to study the rotary engine, or any other internal combustion engine, one of the most important parameters to be measured is the IMEP. It is important that IMEP be measured on a real time, cycle-to-cycle basis.

In the past, IMEP mesurements have been made in reciprocating engines and rotary engines by collecting data which is stored in a data processing system for post run processing. With this method considerable periods of time may be spent collecting data that is defective before the researcher is aware of the erroneous results.

Other approaches included using two analog signals representing pressure and volume, respectively. These signals operate analog circuits which produce an output voltage proportional to IMEP. It appears, however, that these circuits were not fast enough to provide the required detail and accuracy.

Others have measured IMEP by averaging a digitized pressure signal at one crank angle. With such an arrangement analysis of cycle-to-cycle variability and its causes are not possible because events within a cycle may be obscured by this averaging.

The IMEP of a reciprocating engine has been measured in real time over a complete cycle of operation, as disclosed in U.S. Pat. No. 4,111,041 to Rice which is incorporated herein by reference.

Background Art

U.S. Pat. No. 4,094,190 to Jindrick provides apparatus for measuring peak compression in each of a plurality of compression chambers of an internal combustion engine wherein there is produced a sequence of pulses corresponding to the compressions in the chambers. Numerical readouts depicting the value of the peak pressure of the compression in the respective combustion chambers are provided.

U.S. Pat. No. 4,165,650 to Weissler II discloses apparatus utilizing a single fluid pressure sensor/transducer in which the sensor is caused to provide signals proportional to both manifold absolute pressure in an internal combustion engine and atmospheric pressure at alternate times.

U.S. Pat. No. 4,195,531 to Okamura discloses apparatus wherein a pulse generating element responsive to a spring loaded diaphragm mounted in a housing defining a pressure chamber provides an electrical pulse in response to displacement of the diaphragm. An averaging circuit connected to the pulse generating element converts the pulses into a signal having a voltage level representative of the mean value of the pressure variations.

Disclosure of the Invention

In accordance with the invention, there is disclosed apparatus for use with a rotary engine and having the ability to provide a composite signal useful to compute and display IMEP on a cycle by cycle, real-time basis. The apparatus is comprised of four piezoelectric transducers, a constant crank angle interval sampled error averager and corrector (ACC) circuit for each and timing circuits which select output signals from the averager and corrector (AAC) circuits at predetermined times during the 720° operational cycle of a Wankel engine.

Four transducers are positioned in the housing of a Wankel engine such that there is a physical overlap by the rotor of two successive transducers (leading and trailing) for a brief period during the cycle. Each averager and corrector (AAC) circuit has two input signals, namely one transducer signal and an inverted signal from the transducer previously activated and still communicating with a common chamber.

The AAC provides an output signal which is the average difference between the two transducers from which it receives input during an overlap and this signal is used to offset that from the trailing transducer. The averaging period provided by the correlator is a function of rotor angle only and is thus independent of engine rotational speed (rpm). An "effective averaging period" independent of engine RPM is obtained by sampling for brief but constant (10 $\mu$sec) periods at constant (0.18°) intervals of rotor rotation by closing a switch during the overlap region. The overlap region is a fixed number of rotor degrees. The number of single intervals (N) is determined by dividing the total overlap region by 0.18°. As engine speed changes, it is the time during which switch is open that changes. The switch is closed for N times 10 $\mu$sec regardless of RPM up to the speed at which the switch open time is reduced to zero. This occurs at 9000 rpm. Thus, the averaging period is independent of RPM up to the limit of 9000 RPM. (Limit RPM is a circuit design parameter).

The output signals of the four averager and corrector circuits are directed through a multiplexer and passed selectively through amplifiers to provide a composite pressure signal representative of a cycle by cycle, real-time occurrence.

The timing signals for the multiplexer U5 and the AAC circuits are provided by multivibrators and a read only memory which receives signals from a crank angle encoder. The encoder is directly driven from the Wankel engine.

BRIEF DESCRIPTION OF THE DRAWINGS

The details of the invention will be described in connection with the accompanying drawings in which.

BEST MODE FOR CARRYING OUT THE INVENTION

Figure 1:
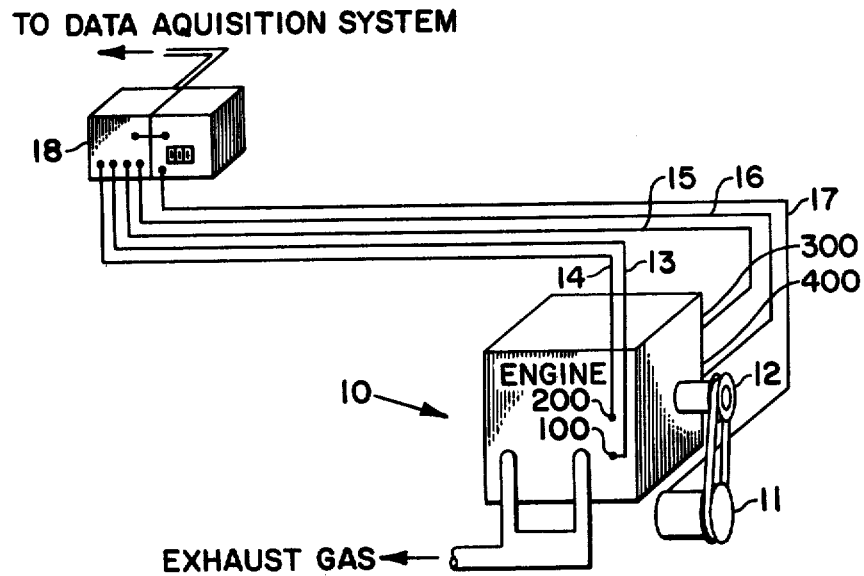
FIG. 1 is a pictorial schematic drawing illustrating the connections of a rotary engine to an apparatus embodying the invention.

Referring now in FIG. 1, there is shown in accordance with the invention a Wankel engine 10 having a crank angle encoder 11 driven from its rotor shaft 12. Pressure transducers 100, 200, 300 and 400 are disposed in the engine housing at prescribed positions and connected by leads 13, 14, 15, and 16, respectively, to a correlator 18. The encoder 11, via a lead 17, is also connected to the correlator 18.

The encoder 11 is belt-driven from the engine output shaft 12 at a three to two-ratio. Thus, for every three output shaft revolutions, the encoder makes two revolutions while the rotor of the Wankel engine 10, by virtue of internal gearing, makes one revolution.

The three to two-engine shaft to encoder drive ratio determines that one engine combustion cycle is represented by 720° of encoder rotation as in the case of a 4-cycle piston engine.

The encoder 11 resolves to 0.35° at its own shaft which corresponds to 0.53° of engine output shaft 12 rotation and 0.18° of rotor rotation.

Figure 2:
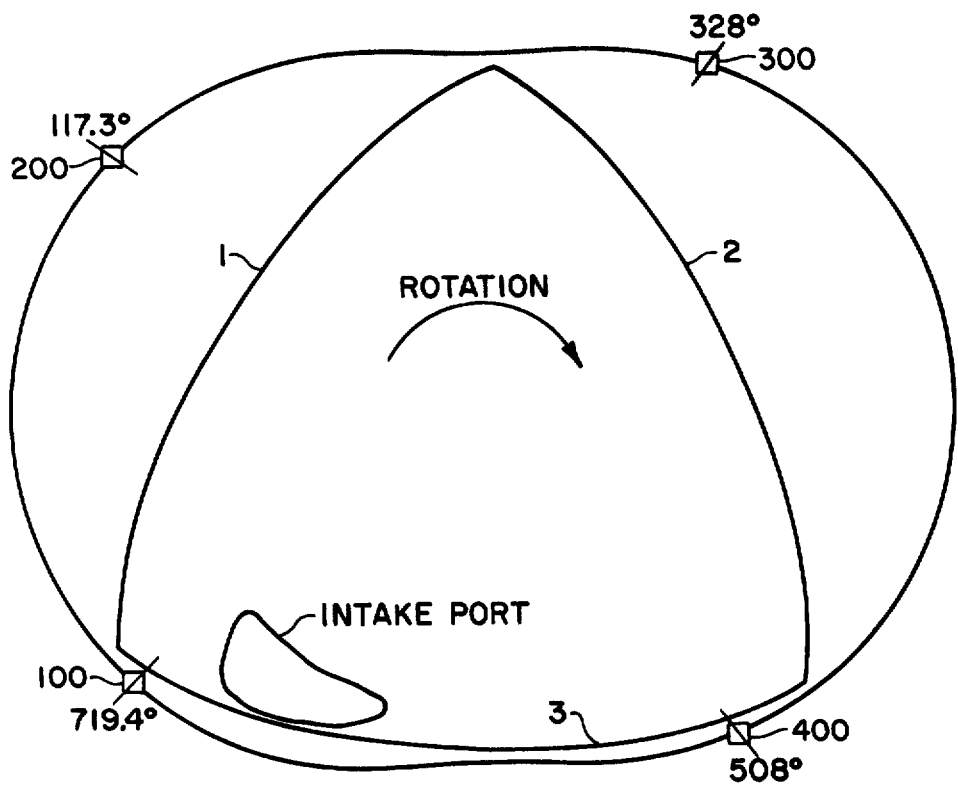
FIG. 2 is a schematic illustration showing the profile of a rotor and the profile of a housing of a Wankel rotary engine.

Referring to FIG. 2, there is shown the profile of the rotor of the Wankel engine 10 of FIG. 1, the rotor having three faces 1, 2 and 3 as shown. Piezoelectric transducers 100, 200, 300 and 400 are disposed in the rotor housing in communication with the interior of the housing at the degree positions indicated, the positions being with respect to 720° of encoder rotation.

Figure 3:
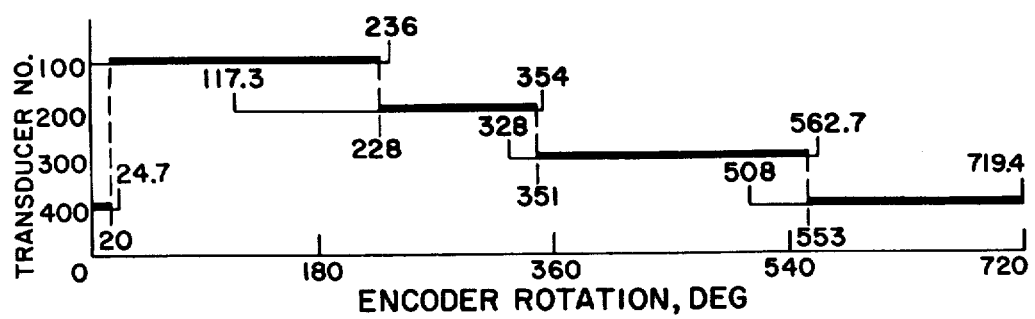
FIG. 3 is a timing chart illustrating the active times of pressure transducers located around the periphery of the Wankel housing, as related to rotation of the rotor.
Figure 4:
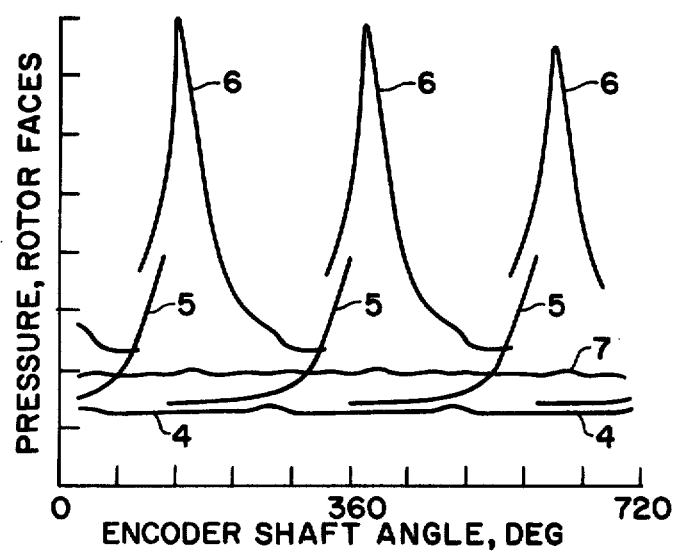
FIG. 4 is in an oscillogram indicating the pressures generated by combustion for each of the three rotor faces.

In FIG. 3, heavy horizontal lines indicate the crankshaft angles over which each of the transducers 100, 200, 300 and 400 are active with the overlap regions also being shown. A 0° encoder rotation reference point is chosen such that the volume of the combustion chamber being investigated is at the minimum volume position (non-firing). In FIG. 4, there are shown the wave shapes of pulses generated by the transducers 100-400 installed in the Wankel engine housing. Lines 4 and 7 are indicative of the outputs of transducers 100 and 400, respectively. The pulses 5 are outputs of transducer 200 while the pulses 6 represent the output of transducer 300.

Figure 5:
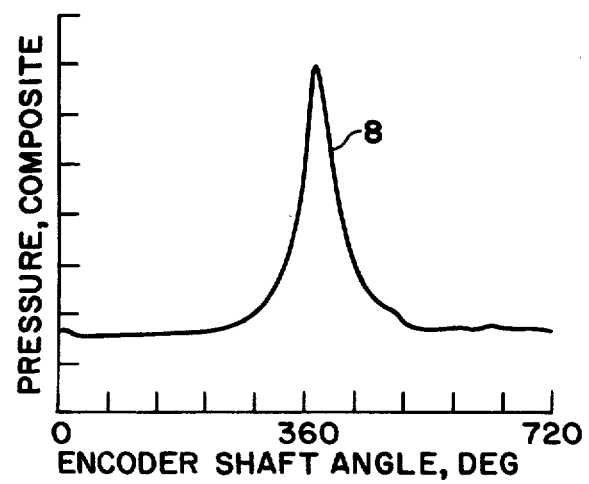
FIG. 5 is an oscillogram which is the composite produced by the correlator of the traces shown in FIG. 4.

FIG. 5 shows a single pulse 8 which is a composite wave shape of all those produced by one combustion chamber. It is the correlator circuitry of the instant invention that combines all the wave shapes of one chamber to achieve real time measurements of indicated mean effective pressure (IMEP) in a rotary engine such as a Wankel engine. This is achieved by displaying the composite wave 8 of FIG. 5 on an oscilloscope or by measuring it with an IMEP meter as explained in U.S. Pat. No. 4,111,041.

Figure 6:
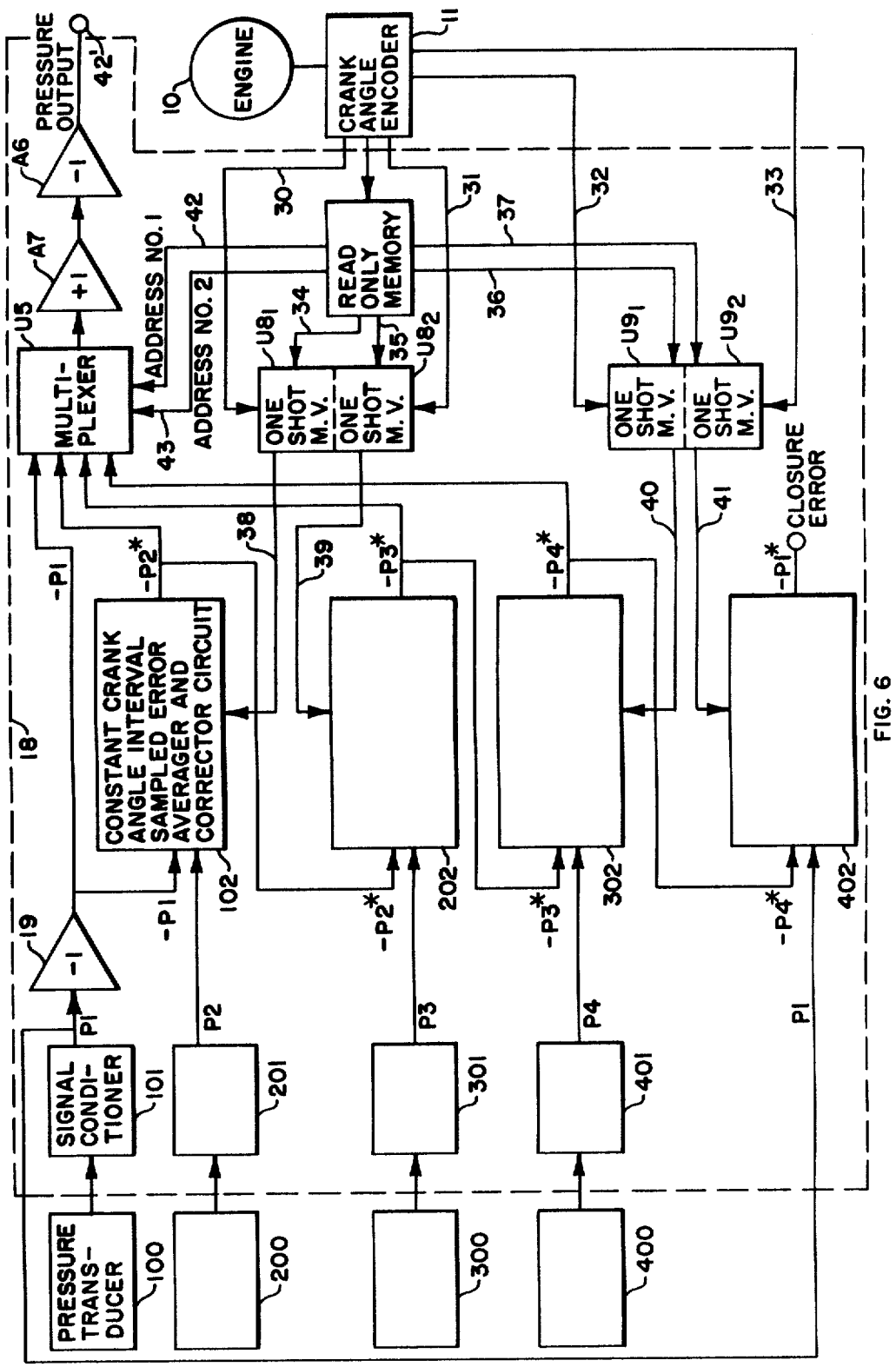
FIG. 6 is a schematic block diagram of the circuitry embodying the invention.

In FIG. 6, there is shown a block diagram of circuitry in the correlator as defined by the dashed lines 18. The electrical signals generated by the pressure transducers 100, 200, 300 and 400 are fed through respective signal conditioners 101, 201, 301 and 401 to respective constant crank angle interval sampled error averager and corrector (AAC) circuits 402, 102, 202, and 302. The P1 output of signal conditioner 101 is also directed through an inverting amplifier 19 to provide a negative P1 input to circuit 102. As shown in FIG. 6, the output of AAC circuit 402 is -P1*, termed closure error. This signal is indicative of the sensitivity correspondence of transducers 100, 200, 300 and 400. It has no function with regard to the desired real time IMEP signal and is used only for equipment diagnostic purposes.

Constant crank angle interval samples error averager and corrector circuit 102 provides a negative P2* output which is directed as an input signal to circuit 202. Circuit 202 provides a negative P3* signal which is directed to an input of circuit 302 and circuit 302 provides a negative P4* output which is directed to an input of circuit 402. Each of the signals negative P2*, negative P3*, negative P4* and negative P1 are directed to a multiplexer U5. The multiplexer U5, as will be explained presently, is controlled so that the inputed signals are directed in a determined manner through an amplifier A7 and an inverter amplifier A6 to produce a pressure output signal at an output terminal 42'. This signal is the composite wave shape 8 shown in FIG. 5 and is measured by an IMEP meter or displayed on an oscilloscope as discussed previously.

To explain the output signals of circuits 102, 202, 302 and 402 the output of circuit 102, that is negative P2*, equals P2-(P2-P1) averaged. Thus, -P2* is P2 offset by the average difference existing between P2 and P1 during the overlap period when transducers 100 and 200 are reading the same pressure. The result is that -P2* is forced to equal P1 at the end of the overlap period so as to provide a smooth composite wave 8 as shown in FIG. 5.

Circuits 202, 302 and 402 function in a similar manner. Thus, P3* is made equal to P2* during the overlap region when transducers 300 and 200 are both active and P4* is made equal to P3* during the overlap region of transducers 400 and 300. The net result is a continuous pressure wave form with all transducers referenced back to P1. Any offset drift in the individual transducer signals is cancelled out during each engine cycle.

As will be explained presently with regard to FIG. 8, each of the circuits 102, 202, 302 and 402 includes a sample-hold amplifier configured as a unity gain inverting summing amplifier at certain times, while its output voltage is determined at alternate times by a hold capacitor. These times are determined by a switch controlled in a prescribed manner by external circuitry.

To the end that the switches of constant crank angle interval sampled error averager and corrector circuits 102, 202, 302 and 402 will be controlled in a required manner, crank angle encoder 11 directs timing signals every 0.18° of rotor rotation through leads 30, 31, 32 and 33 to one shot multivibrators U81, U82, U91 and U92, respectively.

Figure 7:
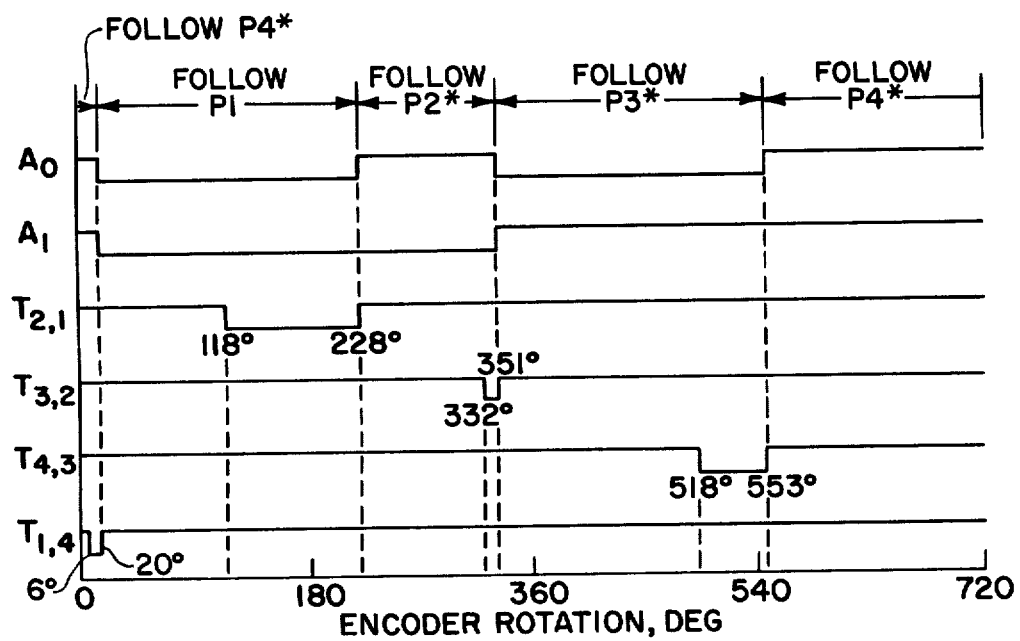
FIG. 7 is a timing diagram of code signals related to twice the angular position of the Wankel engine rotor over a full cycle of operation.

The one shot multivibrators U81, U82, U91 and U92 also receive overlap signals from a read only memory U7 via leads 34, 35, 36 and 37, respectively. These signals are shown as T2,1; T3,2; T4,3; and T1,4 in FIG. 7. These multivibrators control the switches of circuits 102, 202, 302 and 402, respectively, by means of signals directed through leads 38, 39, 40 and 41, respectively. In order to select which of the signals, negative P1, negative P2*, negative P3* or negative P4* will be passed through multiplexer U5 and amplifiers A7 and A6 to the output terminal 42', address control signals A0 and A1 are directed through leads 42 and 43 to the multiplexer U5. These signals, A0 and A1, are shown in FIG. 7.

Figure 8:
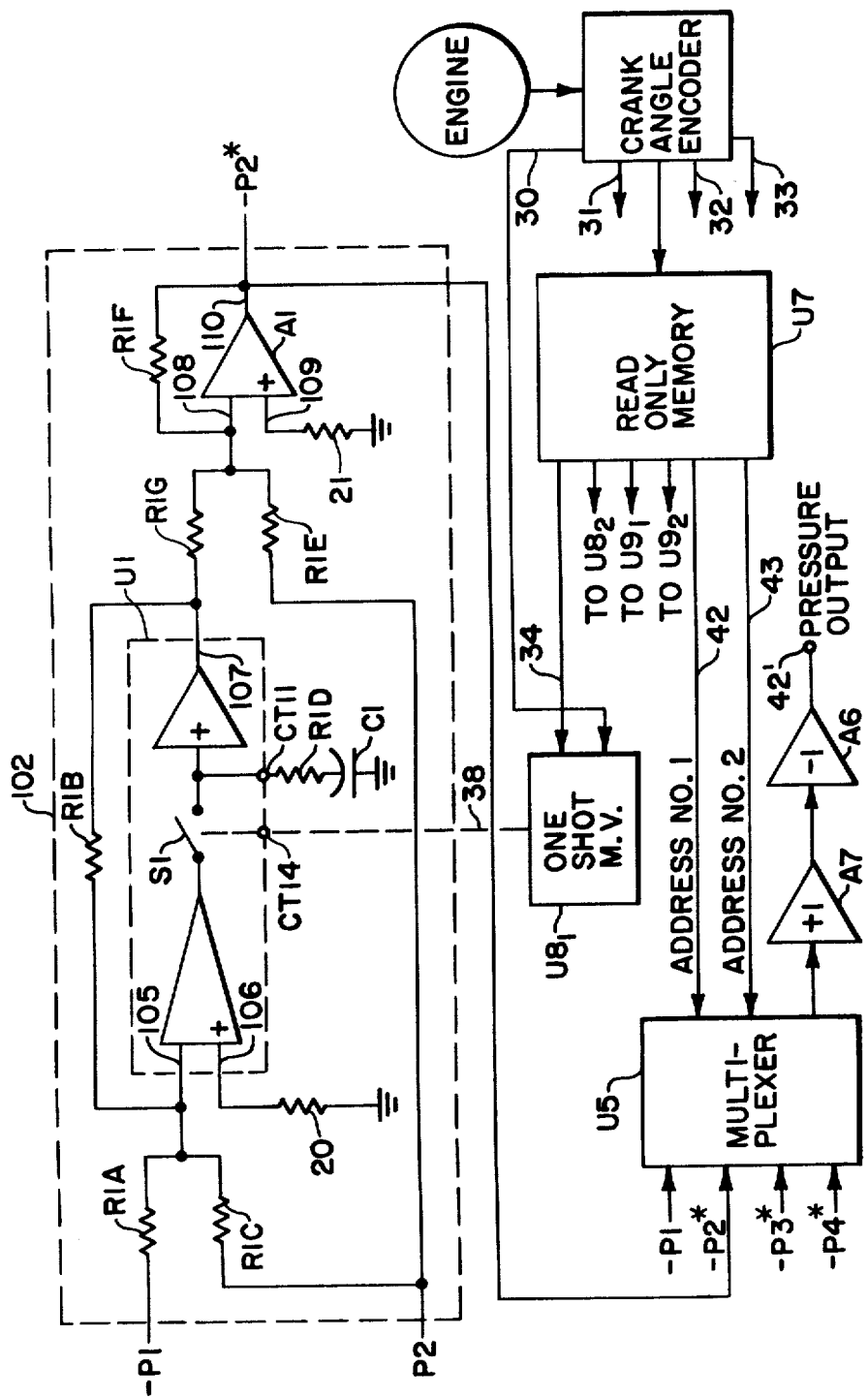
FIG. 8 is a schematic block diagram showing some of the circuitry of FIG. 6 in detail.

Referring now to FIG. 8, there is shown a block diagram similar to that of FIG. 6 except that the circuitry of the constant crank angle interval sample error averager and corrector circuit 102 is shown in detail. Components and blocks in FIG. 8 corresponding to those in FIG. 6 are identified by like numerals.

The constant crank angle interval sampled error averager and corrector circuit 102 includes a commercially available sample-hold amplifier U1 and an amplifier A1 having input terminals 108, 109 and an output terminal 110. The sample-hold amplifier U1 is provided with input terminals 105 and 106, an output terminal 107 and contacts 11 and 14. Pressure signals negative P1 and P2 are fed through respective resistors R1A and R1C to input terminal 105 of U1, terminal 106 being connected to ground through a resistor 20. Signal P2 is also directed through a resistor R1E to input terminal 108 of amplifier A1 which also receives the output signal of U1 at output terminal 107 via a resistor R1G. The output of U1 is connected back to the input terminal 105 by means of a resistor R1B. Likewise, the output of amplifier of A1 at 110 is returned to its input terminal 109 through a resistor R1F.

The sample switch S1 of the sample-hold amplifier U1 cooperates with the resistor R1D and the capacitor C1 which are serially connected between contact 11 and ground. Sample switch S1 is controlled from one shot multivibrator U81, the output of which is applied to contact CT 14 of U1 via a lead 38.

When sample switch S1 is closed, sample-hold amplifier U1 functions as a unity gain inverting summer. However, when sample switch S1 is open, the output of U1 at terminal 107 is determined by the voltage on capacitor C1. The values of the resistors, capacitors and other components of circuit 102, as well as those of 202, 302 and 402, are listed elsewhere in the specification.

Switch S1 is controlled by multivibrator U8$_1$. U8$_1$ is controlled such that a 10 $\mu$sec pulse is generated (signal 38) every time signal 30 goes from logic "zero" to logic "one". The function of signal 34 is to allow pulses to be generated only during the overlap region 1,2. This information is stored in the Read Only Memory. Signal 34 is T$_{2,1}$ shown in FIG. 7.

Preferably, sampling is made over the whole overlap region, with 90% being utilized in the AAC circuits 102, 202, 302 and 402 of FIG. 6. Sampling for small portions of the overlap can be made with proportionately lower accuracies.

To the end that the output of circuit 102 as manifested at output terminal 110 of amplifier A1 will be negative P2* equal P2-(P2-P1) average, sampling switch S1 is closed for approximately 10$\mu$ seconds for each 0.18° of rotor rotation by a signal from one-shot multivibrator U81 over substantially all of the combustion cycle in which both transducers 100 and 200 are being subjected to pressure (overlap). During this time the output of U1 is the instantaneous difference between P1 and P2 when switch 1 is closed, and the average value of this difference when switch 1 is open.

The average difference between P1 and P2 which existed during the overlap region is applied to input terminal 108 of amplifier A1 together with the signal P2. This produces as an output of circuit 102 the desired negative P2*. As indicated previously, circuits 202, 302 and 402 operate in the same manner as constant crank angle interval sampled error averager and corrector circuit 102. The amplifier A1 is a unity gain inverting summer.

The signals negative P2*, negative P3*, and negative P4* which are the outputs of circuits 102, 202 and 302, respectively, together with the signal negative P1 are applied as inputs to the analog multiplexer U5. In order to select which of the input signals will be directed through amplifiers A7 and A6 to the output terminal 42', address signals corresponding to wave shapes A0 and A1 of FIG,. 7 are supplied from the read only memory U7 through leads 42 and 43, respectively, to the multiplexer U5.

Amplifier A7 is a high input impedance unity gain buffer amplifier. It serves to prevent the multiplexer "on" resistances from affecting the output. Amplifier A6 is a unity-gain inverting amplifier used to restore the polarity of the input signal.

The read only memory U7 is the primary circuit generating control signals for the correlator. U7 is an eight-bit by 256 word read-only memory. In order to correlate the outputs of the read only memory U7 to the position of the rotor in the Wankel engine 10, crank angle encoder 11 produces a code which is an eight-bit binary number specifying the encoder shaft angle in increments of 720°/256 or approximately 2.8°. Because the code is complementary, encoder position 0° is represented by all "ones" and encoder position 720° is represented by all "zeros".

The output of circuit 102 during non-overlap is -P2* which is P2 offset by the average difference existing between P2 and P1 during the overlap. The effect is to produce a new signal, -P2*, which is similar to P2 except that it has been offset by an amount sufficient to make -P2* equal to P1 at the end of the overlap region.

The output at "Pressure Output" terminal 42' is as follows: Prior to overlap (1,2) it equals (i.e. follows) P1, during overlap it equals P1, after overlap it equals -P2*. Similar action occurs during the other overlap regions. Signal 42' is selected from either -P1, -P2*, -P3*, -P4* as determined by multiplexer U5 which selector is made based on encoder position through the means of the Read Only Memory which generates the multiplexer control signals "Address 1" and "Address 2".

Inasmuch as the circuits 202, 302, and 402 are identical to the constant crank angle interval sampled error averager and corrector circuit 102 except for certain component values, those circuits are not shown in detail in FIG. 6. For circuit 202 the resistors are 1A through R1G would be identified as resistors R2A through R2G. Similarly, for circuit 202 switch S1 would be S2, capacitor C1 would be C2 and amplifier A1 would be A2. In circuit 302 the numerals 2 would all be changed to 3 and in circuit 402 the numerals would be changed to 4 as, for example, S4, C4, and R4D. A list of the values of the various components is provided below.

| PARTS LIST | |
|---|---|
| DESIGNATION | DESCRIPTION |
| U1, U2, U3, U4 | Analog Devices AD583KD Sample-Hold |
| A1, A2, A3, A4, 19 A6 | Operational Amplifier Type 741 |
| A7 | Operational Amplifier LM310N Buffer |
| U5 | Analog Devices AD7502KN switch |
| U7 | 256X8 E-PROM-1702A |
| U8, U9 | Dual One-Shot Multivibrator 74LS221N |
| R1A-R1G, R2A-R2G, R3A-R3G, R4A-R4G | 10K ohm, 0.1% matched |
| C1 | 0.031 ufd. |
| C2 | 0.0049 ufd |
| C3 | 0.01 ufd |
| C4 | 0.004 ufd |

The capacitors C1–C4 correspond to the overlap degrees shown in FIG. 7 as follows:

| CAPACITOR | WAVE SHAPE | OVERLAP |
|---|---|---|
| C1 | T2, 1 | 110.0° |
| C2 | T3, 2 | 17.0° |
| C3 | T4, 3 | 36.0° |
| C4 | T1, 4 | 14.0° |

It will be understood that changes and modifications may be made to the above described circuitry by those skilled in the art without departing from the spirit and scope of the invention as set forth in the claims appended hereto.

What is claimed is:

1. Apparatus for producing a continuous pressure waveform suitable for input to an IMEP meter to indicate the IMEP of a rotary engine having a rotor with three or more faces disposed for rotation in a housing and comprising:
   - a plurality of pressure to voltage transducers positioned in the engine housing in communication with the interior thereof, said transducers being positioned relative to the rotor such that there are predetermined periods of overlap between each transducer and the transducer preceding it;
   - a plurality of averager and corrector (AAC) circuits each of which measures the instantaneous difference in pressure between one of said transducers and the preceding one during an overlap period of those transducers and produces an output signal which is offest by the average of said difference;
   - timing circuit means for producing pulses which correspond to predetermined positions of the rotor;
   - multiplexer means for receiving the output signals of said ACCs and having control inputs for receiving control address signals from said timing means whereby said AAC circuit output signals are selectively passed by said multiplexer to an output terminal; and
   - means responsive to said timing means for producing control signals for said (AAC) circuits whereby the instantaneous pressure difference between any two transducers is sampled only during an overlap period of those two transducers.

2. The apparatus of claim 1 and including a buffer amplifier and an inverting amplifier serially connected between the output of said multiplexer and said output terminal.

3. The apparatus of claim 1 wherein each AAC circuit includes switch means and averaging means connected therewith to average the difference between transducer pressures provided to said AAC circuit during overlap of those transducers by conduction of said switch.

4. The apparatus of claim 3 wherein the means for producing control signals for said AAC circuits are respective one-shot multivibrators activated by said timing means.

5. The apparatus of claim 3 wherein said averaging means comprises a resistor and a capacitor serially connected between the output of said switch means and ground.

6. The apparatus of claim 1 wherein said timing means comprises a crank angle encoder (11) driven by the shaft of said engine to provide rotor position signals; a read only memory (U7) responsive to said rotor position signals for generating overlap signals and address signals (ROM); means for directing rotor position signals from said encoder (11) to said ROM; means (30,31,32,33) for directing rotor position signals from said encoder (11) to said means (U81,U82,U91, U92) for producing control signals, and means (34,35,36, 37) for directing overlap signals from said ROM to said means (U81,U82,U91, U92) for producing control signals for said AAC circuits; and address directing means (42,43) for directing address signals to said multiplexer from said ROM whereby respective output (42,43) signals of said AAC circuits are selectively passed through said multiplexer to said output terminal during periods corresponding to prescribed angular positioons of the engine rotor.

7. The apparatus of claim 1 wherein the engine rotor has three faces and wherein four transducers are disposed in the engine housing at positions of approximately 117.3°, 328°, 508° and 719.4° with respect to 720° of rotation of a crank angle encoder which corresponds to 360° of rotor rotation.

8. The apparatus of claim 4 wherein the respective multivibrators are connected to respective ones of said switches in said AAC circuits and wherein said multivibrators render said respective switches conducting at a repetitive rate such that said averaging circuit will produce a d-c signal.

9. The apparatus of claim 8 wherein each of said switches conducts for $10\mu$ seconds for each 0.18° of rotation of said rotor during the overlap period of the transducers which are providing signals to the respective AAC circuit in which a particular switch is located thereby causing the effective averaging period to be independent of engine RPM.

10. The apparatus of claim 1 wherein each AAC circuit measures the instantaneous pressure difference between the two transducers from which it receives pressure signals a plurality of times during overlap of the transducer.

11. The apparatus of claim 1 wherein the sampling and measurement of the instantaneous pressure difference is made over at least 90% of the overlap period.

* * * * *